(12) United States Patent
VanGilder

(10) Patent No.: US 10,617,038 B2
(45) Date of Patent: Apr. 7, 2020

(54) ZERO-EQUATION TURBULENCE MODELS FOR LARGE ELECTRICAL AND ELECTRONICS ENCLOSURE APPLICATIONS

(71) Applicant: SCHNEIDER ELECTRIC IT CORPORATION, West Kingston, RI (US)

(72) Inventor: James William VanGilder, Pepperell, MA (US)

(73) Assignee: SCHNEIDER ELECTRIC IT CORPORATION, West Kingston, RI (US)

(*) Notice: Subject to any disclaimer, the term of this patent is extended or adjusted under 35 U.S.C. 154(b) by 278 days.

(21) Appl. No.: 15/643,122

(22) Filed: Jul. 6, 2017

(65) Prior Publication Data
US 2018/0014427 A1    Jan. 11, 2018

Related U.S. Application Data

(60) Provisional application No. 62/360,104, filed on Jul. 8, 2016.

(51) Int. Cl.
G06F 17/50 (2006.01)
H05K 7/20 (2006.01)
G01K 13/02 (2006.01)

(52) U.S. Cl.
CPC ............ *H05K 7/207* (2013.01); *G01K 13/02* (2013.01); *G06F 17/5004* (2013.01); *G06F 17/5009* (2013.01); *H05K 7/20554* (2013.01); *H05K 7/20745* (2013.01); *F25D 2331/804* (2013.01); *G01K 2013/024* (2013.01);
(Continued)

(58) Field of Classification Search
CPC ............ G06F 17/5009; G05D 23/1934; H04L 69/329; F24F 11/0001; F24F 13/18; H05K 7/20836
See application file for complete search history.

(56) References Cited

U.S. PATENT DOCUMENTS 8,631,411 B1 * 1/2014 Ghose .................. H04L 69/329
718/102
2007/0038414 A1    2/2007 Rasmussen et al.
2007/0078635 A1    4/2007 Rasmussen et al.
(Continued)

OTHER PUBLICATIONS

"Optimizing facility operation in high density data center environments," 2007, Hewlett-Packard Development Company, pp. 1-25.
(Continued)

*Primary Examiner* — Kandasamy Thangavelu
(74) *Attorney, Agent, or Firm* — Lando & Anastasi, LLP

(57) ABSTRACT

A method comprises performing an analysis of airflow and temperature distribution in an indoor environment utilizing a hybrid turbulence model including a Chen-Xu model used for analysis of bulk flow and a wall function used in first grid cells bounding solid objects in the indoor environment and adjusting physical layout and/or operating parameters of heat producing electrical equipment and/or a cooling system of the indoor environment responsive to results of the analysis to improve one of temperature distribution within the indoor environment and operating efficiency of the cooling system of the indoor environment.

20 Claims, 10 Drawing Sheets

(52) U.S. Cl.
CPC ...... *G01K 2213/00* (2013.01); *G06F 2217/16* (2013.01); *G06F 2217/80* (2013.01)

(56) References Cited

U.S. PATENT DOCUMENTS

| | | | |
|---|---|---|---|
| 2007/0174024 A1 | 7/2007 | Rasmussen et al. | |
| 2008/0174954 A1 | 7/2008 | VanGilder et al. | |
| 2009/0138313 A1 | 5/2009 | Morgan et al. | |
| 2010/0082178 A1* | 4/2010 | Dawson | F24F 11/0001 700/300 |
| 2010/0131109 A1 | 5/2010 | Rasmussen et al. | |
| 2010/0256959 A1 | 10/2010 | VanGilder et al. | |
| 2010/0286955 A1 | 11/2010 | VanGilder et al. | |
| 2010/0286956 A1 | 11/2010 | VanGilder et al. | |
| 2010/0287018 A1 | 11/2010 | Shrivastava et al. | |
| 2011/0077795 A1 | 3/2011 | VanGilder et al. | |
| 2011/0246147 A1 | 10/2011 | Rasmussen et al. | |
| 2011/0301911 A1 | 12/2011 | VanGilder et al. | |
| 2011/0307820 A1 | 12/2011 | Rasmussen et al. | |
| 2012/0041569 A1 | 2/2012 | Zhang et al. | |
| 2012/0059628 A1 | 3/2012 | VanGilder et al. | |
| 2012/0071992 A1 | 3/2012 | VanGilder et al. | |
| 2012/0158387 A1 | 6/2012 | VanGilder et al. | |
| 2012/0245905 A1 | 9/2012 | Dalgas et al. | |
| 2013/0006426 A1 | 1/2013 | Healey et al. | |
| 2013/0030585 A1 | 1/2013 | Rasmussen et al. | |
| 2013/0046514 A1 | 2/2013 | Shrivastava et al. | |
| 2013/0073258 A1 | 3/2013 | VanGilder et al. | |
| 2014/0029196 A1* | 1/2014 | Smith | G05D 23/1934 361/679.53 |
| 2014/0039852 A1 | 2/2014 | Zhang et al. | |
| 2014/0122033 A1 | 5/2014 | VanGilder et al. | |
| 2014/0330447 A1 | 11/2014 | VanGilder et al. | |
| 2014/0358471 A1 | 12/2014 | VanGilder et al. | |
| 2015/0025833 A1* | 1/2015 | VanGilder | H05K 7/20836 702/136 |
| 2015/0234397 A1 | 8/2015 | VanGilder et al. | |
| 2015/0331977 A1 | 11/2015 | Healey et al. | |
| 2016/0040904 A1* | 2/2016 | Zhou | F24F 13/18 700/276 |
| 2016/0188764 A1 | 6/2016 | VanGilder et al. | |
| 2016/0234972 A1 | 8/2016 | Billet et al. | |
| 2016/0350460 A1* | 12/2016 | Cruz | G06F 17/5009 |
| 2017/0188486 A1 | 6/2017 | VanGilder et al. | |

OTHER PUBLICATIONS

Agonafer, D. et al., 1996, The LVEL turbulence model for conjugate heat transfer at low Reynods numbers, Advances in Electronic Packaging, vol. 18, Application of CAE/CAD Electronic Systems, pp. 23-26.

Ahmad, Jasim U. et al., "Navier-Stokes simulation of air-conditioning facility of a large modem computer room," Jun. 2005, Proceedings of the 2005 ASME Fluids Engineering Division Summer Meeting and Exhibition, pp. 1-6.

Beitelmal et al., "Thermo-Fluids Provisioning of a High Performance High Density Data Center", Apr. 22, 2006, Springer Science and Business Media, Inc, Distributed and Parallel Databases, 21, pp. 227-238 DOI:1 0.1 007/s10619-005-0413-0.

Bejan, A, 1984, Convection Heat Transfer, "Free Stream Turbulence," Ch. 8, pp. 282-305.

Blay, D. et al., 1992, Confined turbulent mixed convection in the presence of a horizontal buoyant wall jet, Foundamentals of Mixed Convection, 213, 65-72.

Chen, Q. et al., 1998, A zero-equation turbulence model for indoor airflow simulation, Energy and Buildings, 28, 137-144.

Gilbert, R. Validation of Computational Fluid Dynamics Based Data Center Cyber-Physical Models. Arizona State University. May 2012. [Retrieved Feb. 21, 2013].[Retrieved from internet: <URL:http://impact.asu.edu/thesis/Robin_thesis.pdf>]. entire document.

Healey, C., et al., "Potential-Flow Modeling for Data Center Applications," Proceedings of the ASME 2011 Pacific Rim Technical Conference & Exposition on Packaging and Integration of Electronic and Photonic Systems, IPACK2011-52136, Jul. 6-8, 2011.

Jeffrey Rambo et al., "Modeling of data center airflow and heat transfer: State of the art and future trends", Distributed and Parallel Databases, Kluwer Academic Publishers, BO, vol. 21, No. 2-3, Jan. 20, 2007 (Jan. 20, 2007), pp. 193-225, XP019499845, ISSN: 1573-7578, DOI:10.1007/S10619-006-7007-3.

Jeonghwan Choi et al, "A CFD-Based Tool for Studying Temperature in Rack-Mounted Servers", IEEE Transactions on Computers, IEEE Service Center, Los Alamitos, CA, US, vol. 57, No. 8, Aug. 1, 2008 (Aug. 1, 2008), pp. 1129-1142, ISSN: 0018-9340, DOI: 10.1109/TC.2008.52.

Launder, B.E. et al., 1974, The numerical computation of turbulent flows, Computer Methods in Applied Mechanics and Energy 3:269-289.

Nielsen, P.V., 1990, Specification of a two-dimensional test case, Aalborg, Denmark: Aalborg University, pp. 23.

Patanskar, S.V., 1980, Numerical Heat Transfer and Fluid Flow, Taylor & Francis, pp. 126-131.

Refai-Ahmed G. et al., "Analysis of flow distribution in power supply using flow network modeling (FNM)", Thermal and Thermomechanical Phenomena in Electronic Systems, 2000, IT HERM 2000, The Seventh Intersociety Conference on May 23-26, 2000, Piscataway, NJ, USA, IEEE, Piscataway, NJ, USA, vol. 1, May 23, 2000 (May 23, 2000), pp. 90-98, ISBN: 978-0-7803-5912-3.

Sharma, R.K, Bash, C.E., and Patel, C.D, "Dimensionless Parameters for Evaluation of Thermal Design and Performance of Large-Scale Data Centers." 8th ASME/AIAA Joint Thermophysics and Heat Transfer Conference, Jun. 24-26, 2002. St. Louis, Missouri.

Shrivastava S.K. et al., "A flow-network model for predicting rack cooling in containment systems", Proceedings of the ASME Interpack Conference—2009: Presented at 2009 ASME Interpack Conference, Jul. 19-23, 2009, San Francisco, California, USA, vol. 2, Jul. 19, 2009 (Jul. 19, 2009), pp. 785-791.

Sinha et al., "Numerical simulation of two-dimensional room air flow with and without buoyancy", Energy and Buildings, vol. 32, Issue 1, Jun. 2000, pp. 121-129.

Spalding, D.B., 1961, A single formula for the "law of the wall", Jouranl of Applied Mechanics, vol. 28, pp. 455-457.

Spalding, D.B., 2013, Chapter 1, Trends, Tricks, and Try-ons in CFD/CHT, Advances in Heat Transfer, vol. 45, Sparrow, E.M. Cho et al., Editors: Burlington: Academic Press, pp. 1-78.

Toulouse M.M. et al., "Exploration of a potential-flow-based compact model of air-flow transport in data centers", Proceedings of the ASME International Mechanical Engineering Congress and Exposition—2009: Presented at 2009 ASME International Mechanical Engineering Congress and Exposition, Nov. 13-19, 2009, Lake Buena Vista, Florida, USA, vol. 13: New Del, vol. 13, Jan. 1, 2009 (Jan. 1, 2009), pp. 41-50, DOI: 10.1115/IMECE2009-10806, ISBN: 978-0-7918-4386-4.

Vanessa Lopez et al: "Heat transfer modeling in data centers", International Journal of Heat and Mass Transfer, vo 1 . 54, No. 25, Sep. 15, 2011 (Sep. 15, 2011), pp. 5306-5318, XP028298268, ISSN: 0017-9310, DOI: 10.1016/J.IJHEATMASSTRANSFER.2011.08.012 [retrieved on Aug. 10, 2011].

Vangilder, Real-Time Data Center Cooling Analysis, APC by Schneider Electric, Billerica, MA USA, Electronics Cooling, Sep. 2011, pp. 14-16.

Vangilder, James W. et al., "Caputure index: an airflow-based rack cooling performance metric," 2007, ASHRAE Transactions, vol. 113, pp. 126-136.

Verhoff, A., The Two-Dimensional, Turbulent Wall Jet with and without an External Free Stream, Office of Naval Research Department of the Navy Contact Nonr 1858(14) in Co-Operation with Bureau of Naval Weapons, Report No. 626, May 1963.

Zhai, Z. et al., 2007, Evaluation of various turbulence models in predicting airflow and turbulence in enclosed environments by CFD: Part-1: summary of prevalent turbulence models, HVAC&R Research, pp. 1-21.

* cited by examiner

ZERO-EQUATION TURBULENCE MODELS FOR LARGE ELECTRICAL AND ELECTRONICS ENCLOSURE APPLICATIONS

CROSS-REFERENCE TO RELATED APPLICATIONS

This application claims priority under 35 U.S.C. § 119(e) to U.S. provisional application Ser. No. 62/360,104 titled "ZERO-EQUATION TURBULENCE MODELS FOR LARGE ELECTRICAL AND ELECTRONICS ENCLOSURE APPLICATIONS," filed Jul. 8, 2016, which is incorporated herein in its entirety for all purposes.

BACKGROUND

1. Technical Field

Aspects and embodiments disclosed herein are directed generally to modelling temperature distribution within an indoor environment including shipping-container-sized enclosures and data centers.

2. Discussion of Related Art

Shipping-container size enclosures having dimension of, for example, 3.0 m in height, 4.4 m in width, and 15 m in length, or other dimensions consistent with industry standard ISO 20 foot (6.06 m) or 40 foot (12.2 m) shipping containers, are popular and convenient for electrical and electronics applications such as modular substations and data centers. Such factory-built products promise higher quality, lower risk, and greater scalability than traditional stick-built facilities. Modular data center units, for example, may include several different container types housing power products, IT equipment, cooling, and other specialized infrastructure. From a thermal design perspective, these large electronics enclosures may be similar to a small data center predominantly populated by airflow-moving objects like IT racks or may be dominated by heat-dissipating objects cooled entirely by natural convection. Regardless of the type of internal objects, externally-mounted, refrigerant-based cooling systems are typically employed to provide reliable operation. Such systems may be sized for extreme climates, solar load, and cooling redundancy while many constraints dictate the placement of internal equipment and cooling units. Consequently, a spatially-detailed thermal analysis is often desired to determine if the entire container volume is adequately and uniformly conditioned.

Whereas traditional electronics products and data centers are typically designed over a period of months or years, leaving sufficient time for thermal analyses and other design verifications, modular products are typically "configured to order" from pre-engineered components and shipped within weeks. Desirably, CFD analyses are performed very early in the sales cycle (to minimize post-sale "re-designs") and this drives the desire for simple, very-niche tools which solve quickly and robustly. In such instances, usability, speed, and robustness of the tool may be higher priorities than absolute accuracy, particularly, in light of typical engineering conservatism about maximum equipment power dissipation, cooling unit capacity, and ambient conditions.

SUMMARY

There are many ways in which a CFD engine can be optimized for practical applications of quickly modeling temperature distribution in an indoor environment, electronics enclosure, or data center including the use of a fairly coarse computational grid, compact (e.g., "black-box") models for objects, and simplified physical models. While the nature of the applications dictates that the CFD models should include all relevant physics like momentum (e.g., strong jets at cooling-unit supplies), buoyancy, and frictional effects, one obvious area for simplification is in turbulence modeling. The most popular, general turbulence model is the "two-equation" k-$\epsilon$ model of Launder and Spalding (1974) (Launder, B. E., and Spalding, D. B. 1974. *The Numerical Computation of Turbulent Flows*. Computer Methods in Applied Mechanics and Energy 3: 269-289) in which additional transport equations are solved for both the turbulent kinetic energy (k) and the turbulent dissipation ($\epsilon$) alongside those for mass, momentum, energy, and, potentially, species conservation. While this model works reasonably well for many applications, including large electrical and electronics enclosures, it increases the number of equations solved by 40% for typical 3D applications, and a fairly fine grid is typically used to reach its accuracy potential. The original and simplest turbulence model is Prandtl's mixing length model (see, for example, Bejan, A. 1984. *Convection Heat Transfer*. New York: John Wiley and Sons.); this model is referred to as a "zero-equation" model as no additional transport equations are solved. Agonofer et al. (1996) (Agonafer, D., Gan-Li L., and Spalding D. B. 1996. *The LVEL turbulence model for conjugate heat transfer at low Reynolds numbers*. Advances in Electronic Packaging—Vol. 18, Application of CAE/CAD Electronic Systems) proposed the popular LVEL zero-equation model which utilizes a wall function at all points in the flow; this model is particularly good for confined flows like small-scale electronics thermal applications but is less appropriate for typical room-scale applications. A newer zero-equation model is that of Chen and Xu (1998) (Chen, Q. and Xu, W. 1998. *A zero-equation turbulence model for indoor airflow simulation*. Energy and Buildings, 28, 137-144) which is popular for enclosed applications and, at one time, was even incorporated as the default turbulence model in a commercial building-modeling CFD tool. The primary benefits of such simple zero-equation models are reduced solved times, easy implementation, and robust performance while delivering acceptable engineering accuracy. (A thorough summary of turbulence models with their specific application to enclosed environments is given in Zhai, Z., Zhang, Z., Zhang, W., and Chen, Q. 2007. *Evaluation of various turbulence models in predicting airflow and turbulence in enclosed environments by CFD: Part-1: summary of prevalent turbulence models*. HVAC&R Research, (6).)

Disclosed herein are methods including use of the Chen and Xu model as well as two related variants which utilize wall functions; one with a rigorous, iterative, implementation and one approximate for modeling temperature distribution within a volume of space in an indoor environment, electronics enclosure, or data center for example, a modular data center. While these methods may apply to other applications, they are described herein with reference to large (shipping-container-size) electrical and electronics enclosures applications. A comparison is performed between these three algebraic turbulence models and the k-$\epsilon$ model to benchmark experimental data and laminar-flow predictions. All zero-equation models disclosed herein provide reasonable accuracy, generally, much better than laminar (no turbulence model) predictions but not quite as good as those of the k-$\epsilon$ model. The wall-function variants provide slightly better accuracy than the Chen-Xu model and the "approximate" implementation provides a good balance between accuracy and computational efficiency.

In accordance with one aspect, there is provided a method comprising performing an analysis of airflow and temperature distribution in an indoor environment utilizing a hybrid turbulence model including a Chen-Xu model used for analysis of bulk flow and a wall function used in first grid cells bounding solid objects in the indoor environment, and adjusting physical layout and/or operating parameters of heat producing electrical equipment and/or a cooling system of the indoor environment responsive to results of the analysis to improve one of temperature distribution within the indoor environment and operating efficiency of the cooling system of the indoor environment.

In some embodiments, the analysis of airflow and temperature is performed on an indoor environment having dimensions consistent with those of an industry standard ISO shipping container.

In some embodiments, the analysis of airflow and temperature is performed on an indoor environment including an externally mounted cooling system.

In some embodiments, the analysis of airflow and temperature is performed on an indoor environment including cooling air supply vents defined in external walls of the indoor environment.

In some embodiments, the analysis of airflow and temperature is performed utilizing a Cartesian grid system with uniform computationally defined grid cells.

In some embodiments, the analysis of airflow and temperature is performed utilizing an approximate wall function technique that does not utilize iterative computations to determine turbulent airflow velocity in the first grid cells bounding solid objects in the indoor environment.

In some embodiments, the approximate wall function technique defines a ratio of turbulent airflow velocity to airflow velocity parallel a wall in the first grid cells bounding solid objects in the indoor environment as a function of Reynolds number in the first grid cells bounding solid objects in the indoor environment.

In some embodiments, the analysis of airflow and temperature is performed utilizing an approximate wall function technique that utilizes iterative computations to determine turbulent airflow velocity in the first grid cells bounding solid objects in the indoor environment.

In some embodiments, turbulent thermal diffusivity in the first grid cells bounding solid objects in the indoor environment is determined as a function of the turbulent airflow velocity in the first grid cells bounding solid objects in the indoor environment.

In some embodiments, adjusting the physical layout and/or operating parameters of the heat producing electrical equipment and/or cooling system of the indoor environment responsive to the results of the analysis causes air temperatures immediately around equipment in the indoor environment to be maintained within a defined range.

In accordance with another aspect, there is provided a computer system including a memory programmed with instructions which, when executed, cause the computer system to perform a method comprising performing an analysis of airflow and temperature distribution in an indoor environment utilizing a hybrid turbulence model including a Chen-Xu model used for analysis of bulk flow and a wall function used in first grid cells bounding solid objects in the indoor environment, and adjusting physical layout and/or operating parameters of heat producing electrical equipment and/or a cooling system of the indoor environment responsive to results of the analysis to improve one of temperature distribution within indoor environment and operating efficiency of the cooling system of the indoor environment.

In some embodiments, the analysis of airflow and temperature is performed on an indoor environment having dimensions consistent with those of an industry standard ISO shipping container.

In some embodiments, the analysis of airflow and temperature is performed on an indoor environment including an externally mounted cooling system.

In some embodiments, the analysis of airflow and temperature is performed on an indoor environment including cooling air supply vents defined in external walls of the indoor environment.

In some embodiments, the analysis of airflow and temperature is performed utilizing a Cartesian grid system with uniform computationally defined grid cells.

In some embodiments, the analysis of airflow and temperature is performed utilizing an approximate wall function technique that does not utilize iterative computations to determine turbulent airflow velocity in the first grid cells bounding solid objects in the indoor environment.

In some embodiments, the approximate wall function technique defines a ratio of turbulent airflow velocity to airflow velocity parallel a wall in the first grid cells bounding solid objects in the indoor environment as a function of Reynolds number in the first grid cells bounding solid objects in the indoor environment.

In some embodiments, the analysis of airflow and temperature is performed utilizing an approximate wall function technique that utilizes iterative computations to determine turbulent airflow velocity in the first grid cells bounding solid objects in the indoor environment.

In some embodiments, turbulent thermal diffusivity in the first grid cells bounding solid objects in the indoor environment is determined as a function of the turbulent airflow velocity in the first grid cells bounding solid objects in the indoor environment.

In some embodiments, adjusting the physical layout and/or operating parameters of the indoor environment responsive to the results of the analysis causes air temperatures immediately around equipment in the indoor environment to be maintained within a defined range.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
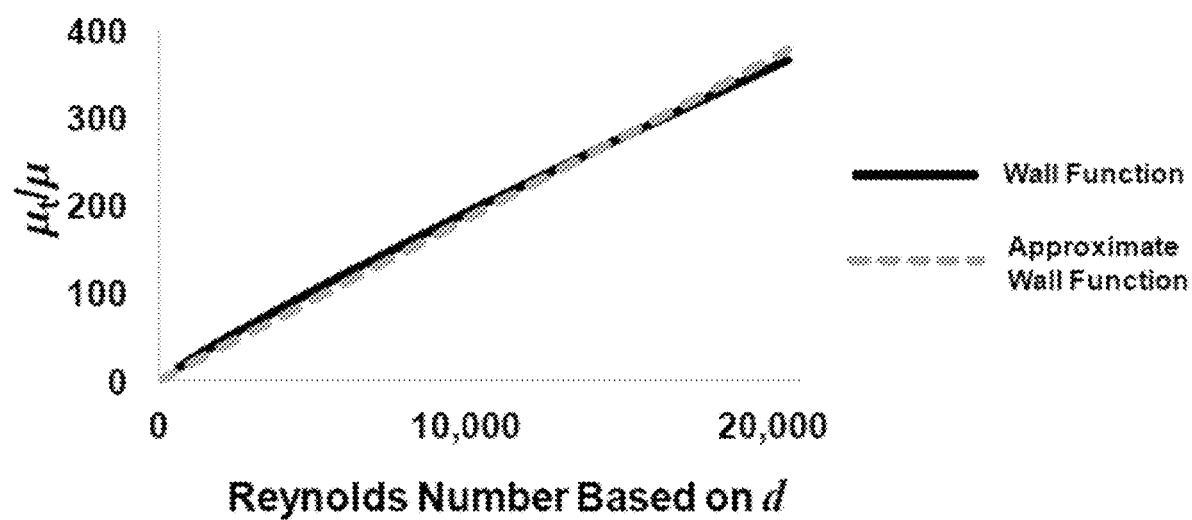
FIG. 1 illustrates a comparison of approximate wall function to rigorous formulation.

Aspects and embodiments disclosed herein are not limited to the details of construction and the arrangement of components set forth in the following description or illustrated in the drawings. The disclosed aspects and embodiments are capable of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Turbulence Models and CFD Modeling

Rather than explicitly model the chaotic motions of turbulent flow at all length scales, turbulence models attempt to account for its overall augmentation of momentum and heat diffusion. This is achieved by replacing the molecular viscosity ($\mu$) and thermal diffusivity ($\alpha$) in the mathematical model with effective values which include an additional turbulent term:

$$\mu_{eff} = \mu + \mu_t \quad \alpha_{eff} = \alpha + \alpha_t \tag{1}$$

Turbulence models, from the simplest zero-equation models to Large Eddy Simulation (LES) models typically include some empiricism based on physical measurements. Further, many turbulence models include additional empiricism in the form of "wall functions" which are based on the idea that, very near solid bounding surfaces, a "universal" velocity profile exists as expressed in the appropriate dimensionless parameters. CFD tools typically use these wall functions in the first layer of fluid grid cells adjacent to a solid boundary to make good estimates for wall friction and heat transfer while avoiding the use of a very fine computational grid. The principal negative characteristics of wall functions are that the near-wall velocity distribution is not truly "universal," and they may involve additional iteration and complication to implement. Further, to achieve good accuracy, the CFD user should ensure that the center of the near-wall grid cell lies outside the so-called "laminar sublayer."

A popular general-purpose CFD tool (ANSYS Fluent v13.0 [2016]) is used for the consistent comparison of all turbulence models disclosed herein. This tool includes the k-$\epsilon$ model as a built-in option and also allows the zero-equation model variants to be defined through user-defined functions. As a check, which is not discussed further, the various k-$\epsilon$ scenarios disclosed herein were also modeled with a building-application-specific CFD tool (FloVENT v11.1 [2016]). While both tools likely utilize slightly different formulations of the k-$\epsilon$ model and/or wall functions, the results obtained from both tools compared very favorably.

For all cases analyzed, a Cartesian grid system with nearly uniform (aspect ratio near one) cells is utilized so far as possible. Pressure-velocity coupling is achieved via the SIMPLE method (Patankar, S. V. 1980. *Numerical Heat Transfer and Fluid Flow*, Taylor & Francis) and first-order discretization was utilized. Although not explicitly disclosed herein, grid-independence checks for each configuration and turbulence model combination were performed. The presented k-$\epsilon$ model results utilize a fairly fine grid (typically on the order of L/300, where L is the typical overall enclosure length scale) and can be considered reasonably "grid independent." Because the spirit of the zero-equation model is to use the model with a fairly coarse grid, results are presented using a grid size of approximately L/100, which is on the order of 150 mm (6 in) for large electrical and electronics enclosures. While laminar simulations normally utilize a very fine grid to explicitly resolve the boundary layer, the same coarse grid used with the zero-equation models is deliberately employed herein; this shows the results one would obtain if the effects of turbulence were simply ignored.

Zero Equation Chen and Xu Model

Following the Chen-Xu model, the turbulent viscosity is computed as:

$$\mu_t = 0.03874 \rho V d \tag{2}$$

where $\rho$ is the fluid density, V is the mean cell velocity, and d is the distance from the center of the grid cell to the nearest solid object. If a Reynolds Number based on d, $Re_d$, is defined then Equation (2) can be written in dimensionless form as:

$$\frac{\mu_t}{\mu} = 0.03874 Re_d \tag{3}$$

The turbulent thermal diffusivity can then be determined by analogy assuming that the turbulent Prandtl Number, $Pr_t$, is a fixed value, for example, Bejan (1984) (Bejan, A. 1984. *Convection Heat Transfer*. New York: John Wiley and Sons):

$$Pr_t = \frac{\mu_t}{\alpha_t} = 0.9 \tag{4}$$

Implementing the Chen-Xu model is fairly straightforward as Equations (2) and (4) are simply applied to all cells. Thus the model accounts for the effects of turbulence in the bulk flow as well as heat transfer and shear stress at the wall.

A subtlety in the Chen-Xu model, however, is the calculation of the length scale d. This is straightforward and easy to compute in the case of empty rooms like the 2D benchmark scenarios discussed here but becomes more complex when multiple solid objects are present. In the latter instance, a convenient estimate of d can be made for all points in the flow by the approximate technique suggested by Spalding (2013) (Spalding, D. B. 2013. *Chapter 1, Trends, Tricks, and Try-ons in CFD/CHT, Advances in Heat Transfer*, Vol. 45. Sparrow, E. M., Cho, Y. I., Abraham, J. P., and Gorman, J. M., editors: Burlington: Academic Press, pp. 1-78) in which d is deduced from the solution of a Poisson Equation which may be solved throughout the application domain prior to the CFD solution. However, it is noted that, for the fairly simple 3D scenario considered in this paper, an exact method for computing d is utilized.

Zero Equation Chen and Xu Model with Wall Function

As an alternative to the Chen-Xu and k-$\epsilon$ models, the latter typically including a wall function, a hybrid model consists of the Chen-Xu model in the bulk flow and a wall function used in the first grid cell bounding solid objects. As discussed above, wall functions are based on the assumption that the shape of the velocity profile parallel to the wall is fairly universal when expressed in the appropriate dimensionless coordinates which comprehend the appropriate physical scales of the application. In one embodiment of the hybrid model the wall function suggested by Spalding (1961) (Spalding, D. B. 1961, *A single formula for the "law of the wall*," Journal of Applied Mechanics, Vol. 28, pp 455-457) may be used:

$$y^+ = u^+ + A\left\{e^{Bu^+} - 1 - Bu^+ - \frac{(Bu^+)^2}{2} - \frac{(Bu^+)^3}{6} - \frac{(Bu^+)^4}{24}\right\} \tag{5}$$

where A=0.1108 and B=0.4 have been determined empirically and the dimensionless velocity and distance from the wall are defined by:

$$u^+ = \frac{u}{u^*} \quad y^+ = \frac{y\rho u^*}{\mu} \tag{6}$$

and $u^*\sqrt{\tau_w/\rho}$ is known as the friction velocity and is defined in terms of the shear stress at the wall $\tau_w$. However, u* need not be explicitly evaluated. The total dimensionless kinematic viscosity is defined as:

$$\mu^+ = 1 + \mu_t/\mu = \frac{dy^+}{du^+} \tag{7}$$

Thus, Equation (5) may be differentiated to determine $\mu^+$ and therefore $\mu_t$. However, because u* is unknown, the process may utilize iteration; the correct u* is the one that satisfies Equation (5) for the computed (dimensional) u and y of the near-wall grid cell. With $\mu_t$ known, $\alpha_t$ can be computed from Equation (4).

In one embodiment disclosed herein, an approximate wall function technique eliminates the additional iteration discussed above and can be coupled with the Chen-Xu (and other) turbulence models. In such an embodiment $\mu_t/\mu$ may be computed for the near-wall grid cell over a range of anticipated Reynolds Numbers $Re_d$, in advance of the CFD simulation, as shown in FIG. 1. It can be shown that this line is the same for all grid sizes when plotted in this dimensionless form. A straight line with intercept at the origin provides a decent fit to the rigorous wall-function curve. Mirroring the format of the Chen-Xu model, this linear relationship between $\mu_t/\mu$ and $Re_d$ may be expressed as:

$$\frac{\mu_t}{\mu} = 0.0185 Re_d \tag{8}$$

Although Equation (8) was developed based on the velocity parallel to the wall, in the wall-function models, the average velocity V is used, consistent with the original Chen-Xu model.

Summarizing, the hybrid models use the Chen-Xu model in the bulk flow and some form of wall function in the near-wall grid cell. The traditional wall function calculation utilizes Equations (5-7) while the approximate method utilizes an equation of the form of Equation (8) for the appropriate near-wall grid cell size. The approximate wall function method is easier to implement and as computationally efficient as the original Chen-Xu model.

2-D Benchmark-Forced Convection

Figure 2A:
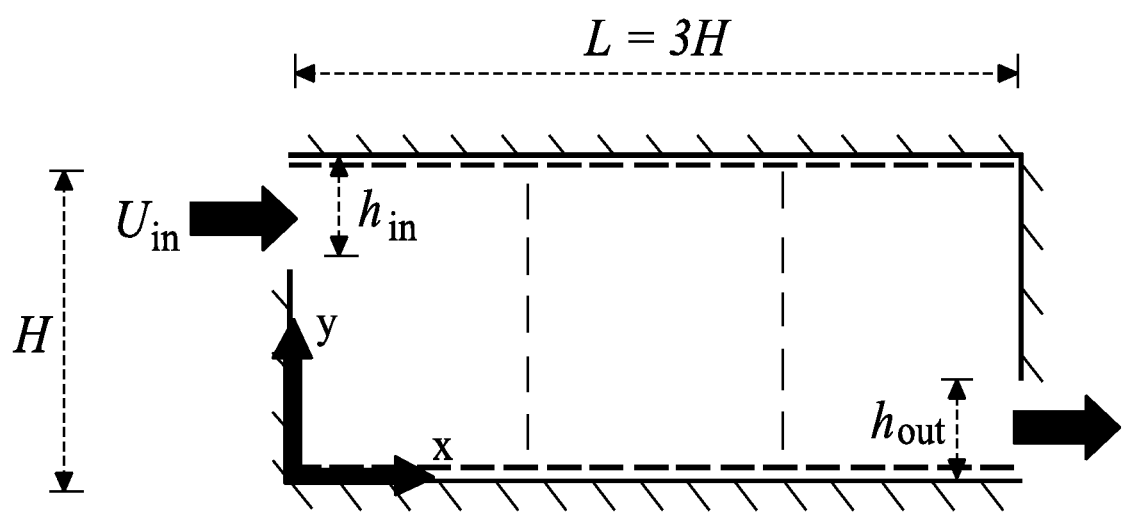
FIGS. 2A-2E illustrate turbulence model comparisons for the Nielsen (1990) benchmark case.

FIG. 2A shows a schematic of the isothermal, forced convection room-airflow benchmark of Nielsen (1990) (Nielsen, P. V. 1990. *Specification of a two-dimensional test case.* Aalborg, Denmark: Aalborg University.) Airflow enters the room at the top left and exits at the bottom right. The room length, inlet height, and outlet height are 9 m (30 ft), 168 mm (6.61 in), and 480 mm (19 in) respectively. The Reynolds Number based on inlet height and inlet velocity is 5,000.

Figure 2B:
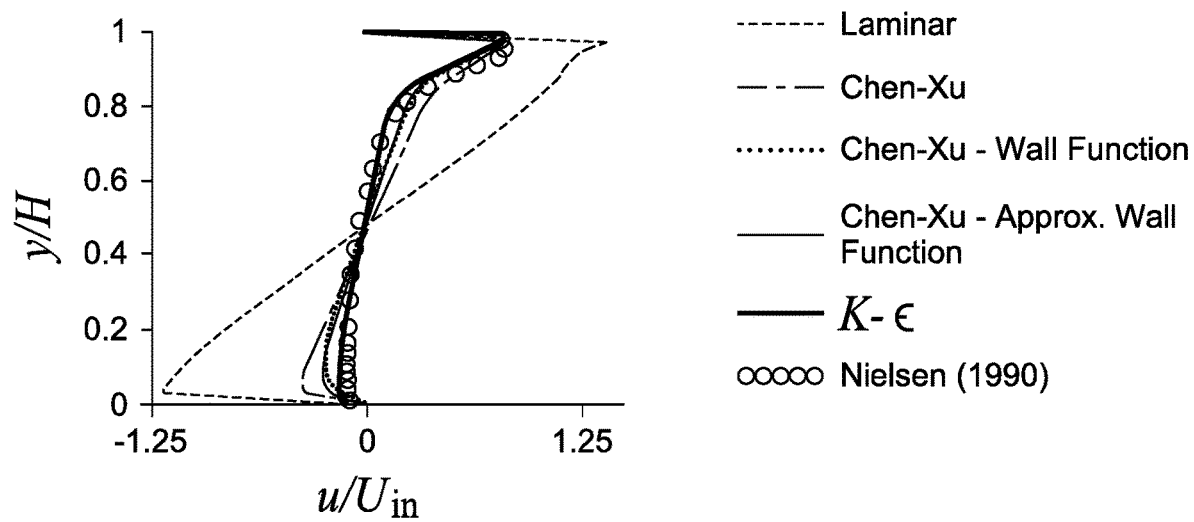
Figure 2C:
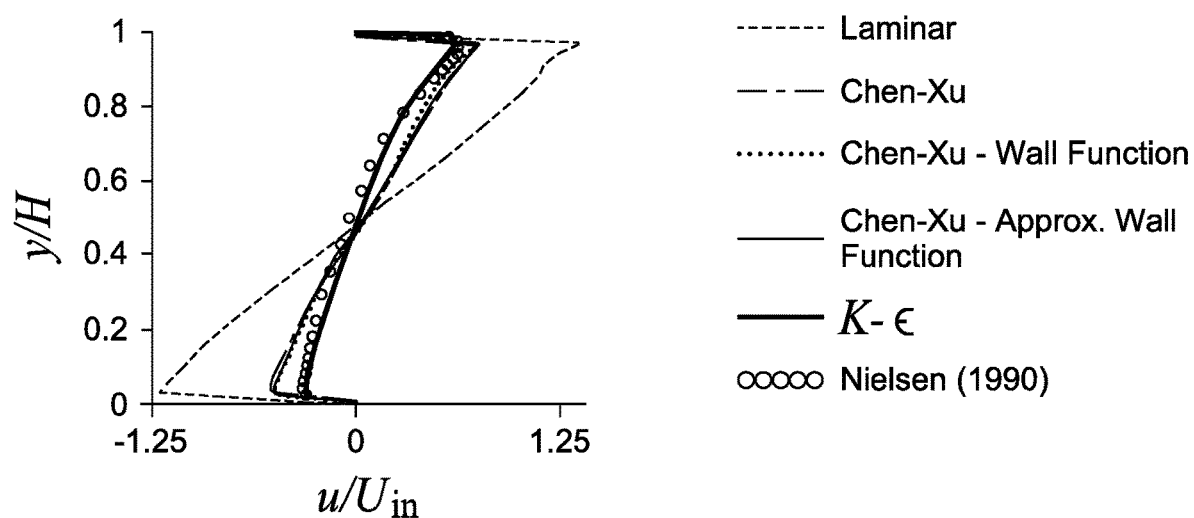

FIGS. 2B and 2C show the u velocity for the various turbulence model results relative to experiment along vertical lines taken at ⅓ and ⅔ of the cavity width, respectively.

Figure 2D:
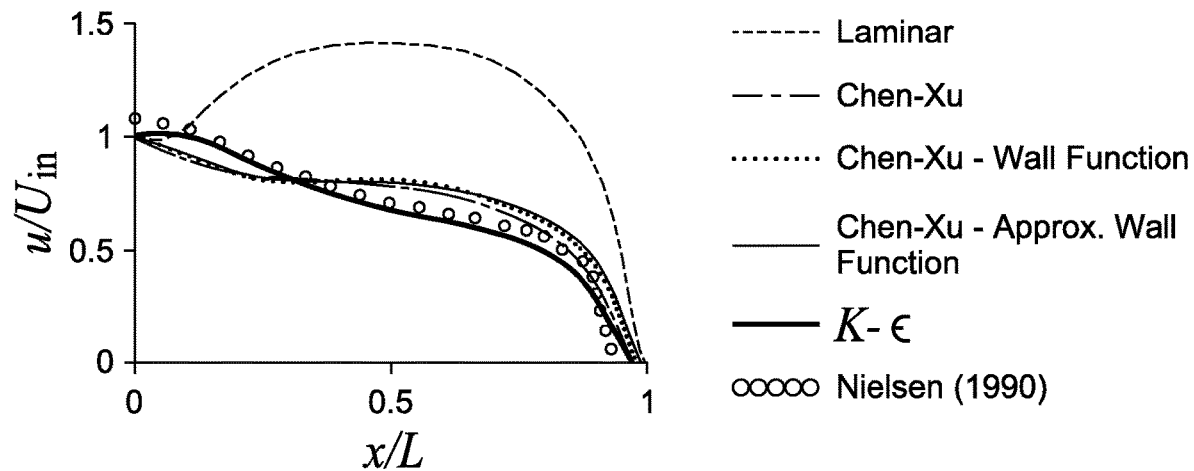
Figure 2E:
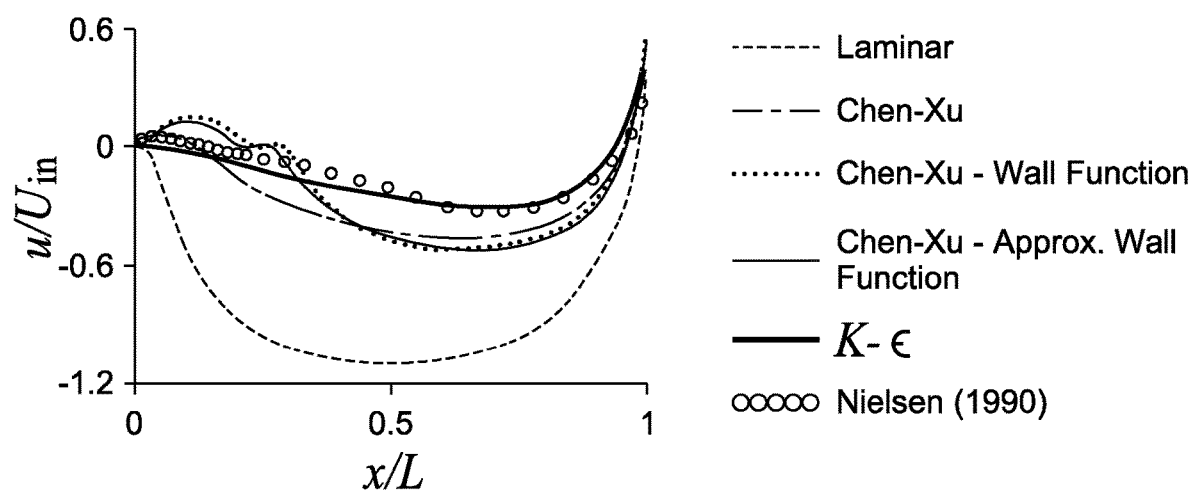

FIGS. 2d and 2e show the u velocity along horizontal lines near the top (y/H=0.97) and bottom (y/H=0.03) of the room, respectively. Overall, the k-ϵ model provides the best comparison to measured data while the laminar (no turbulence model) provides the least favorable comparison. All the zero-equation variants provide reasonable accuracy; the standard Chen-Xu model provides marginally better results than the wall-function variants in FIG. 2D, otherwise, the wall function variants offer slightly improved accuracy. Finally, it is noted that, although not obvious from FIG. 2, streamline and vector plots show that all of the zero-equation models correctly capture a recirculation at the bottom-left corner of the room which the k-ϵ model fails to predict. The laminar model generally does a poor job which highlights a desire to account for the effects of turbulence in some manner.

2-D Benchmark-Mixed Convection

Figure 3A:
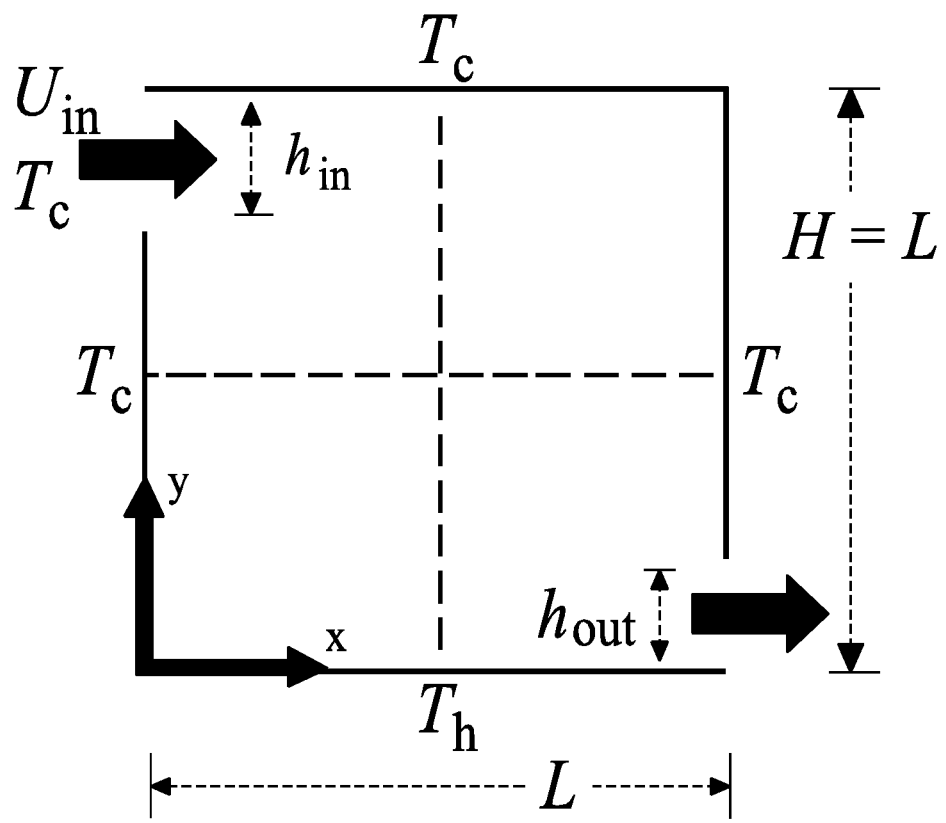
FIGS. 3A-3E illustrate turbulence model comparisons for the Blay et al. (1992) benchmark case.

FIG. 3A shows a schematic of the mixed-convection benchmark of Blay (1992) (Blay, D., Mergui, S., and Niculae, C. 1992. *Confined turbulent mixed convection in the presence of a horizontal buoyant wall jet.* Fundamentals of Mixed Convection, 213, 65-72.) Like the Nielsen benchmark, airflow enters the space at the top left and exits at the bottom right. The cavity dimension L, the inlet height, and outlet height are 1.04 m (40.9 in), 18 mm (0.71), and 24 mm (0.94 in) respectively. The Reynolds Number based on inlet height and velocity is 655. Additionally, the bottom of the cavity is held at a temperature $T_h$ which is warmer than the uniform temperature $T_c$ of the other three sides and inlet temperature. The Rayleigh Number based on a temperature difference $T_h-T_c$ is 2.67×10⁹.

Figure 3B:
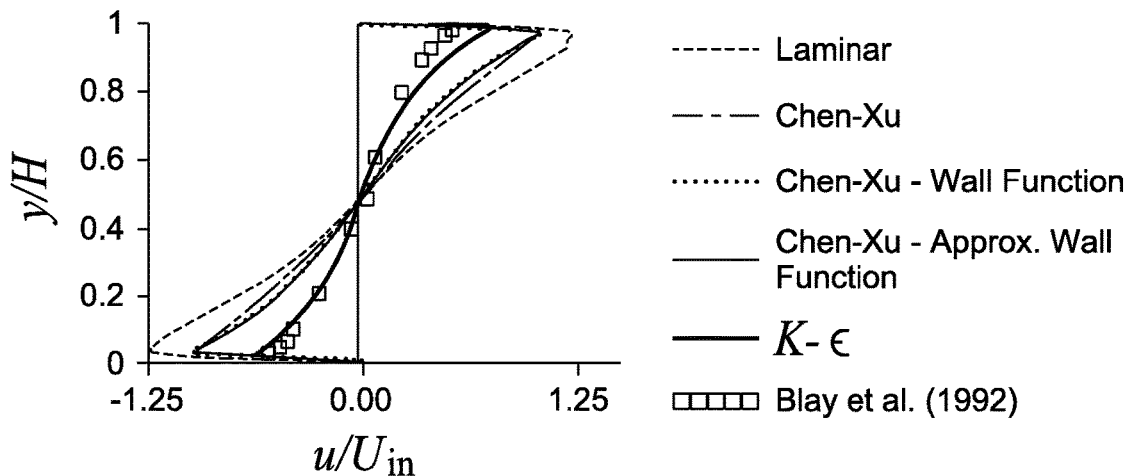
Figure 3C:
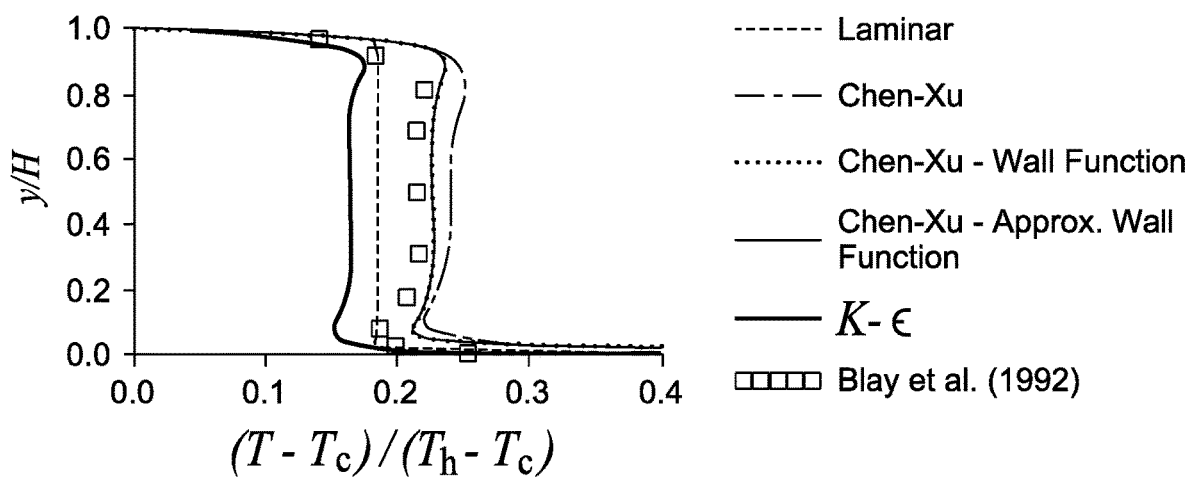
Figure 3D:
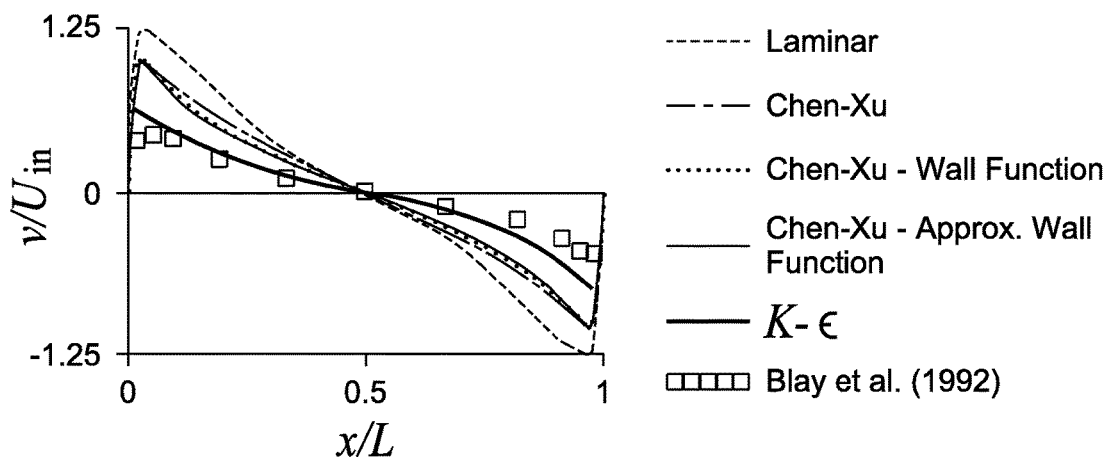
Figure 3E:
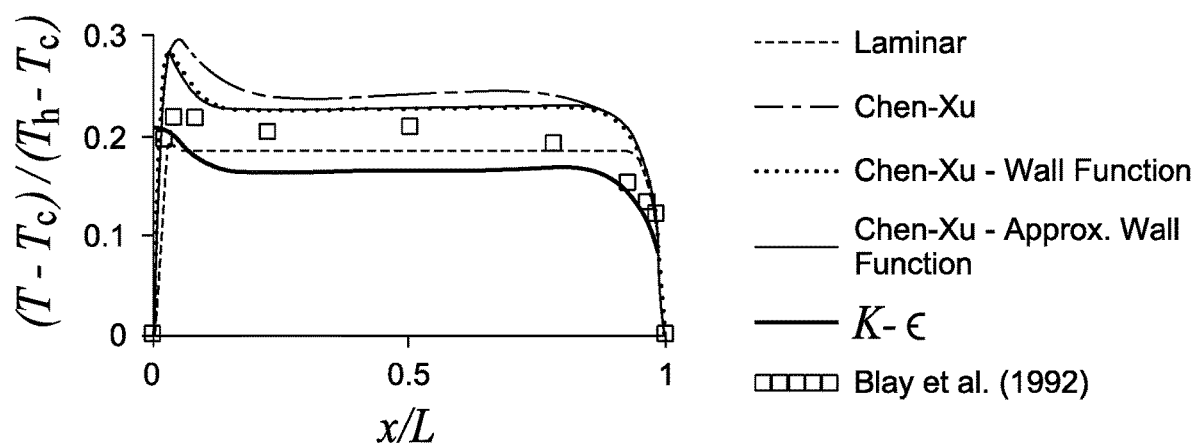

FIGS. 3B and 3C show the u velocity and temperature respectively along a vertical line midway across the cavity. FIGS. 3D and 3E show the v velocity and temperature respectively along a horizontal line through the mid-height of the cavity. The k-ϵ model again performs best when looking at velocity predictions. However, the wall-function variants and even the laminar model yield better overall agreement with temperature measurements. In all cases, again, the wall function variants deliver very similar predictions.

3d Example—Modular Substation

Figure 4A:
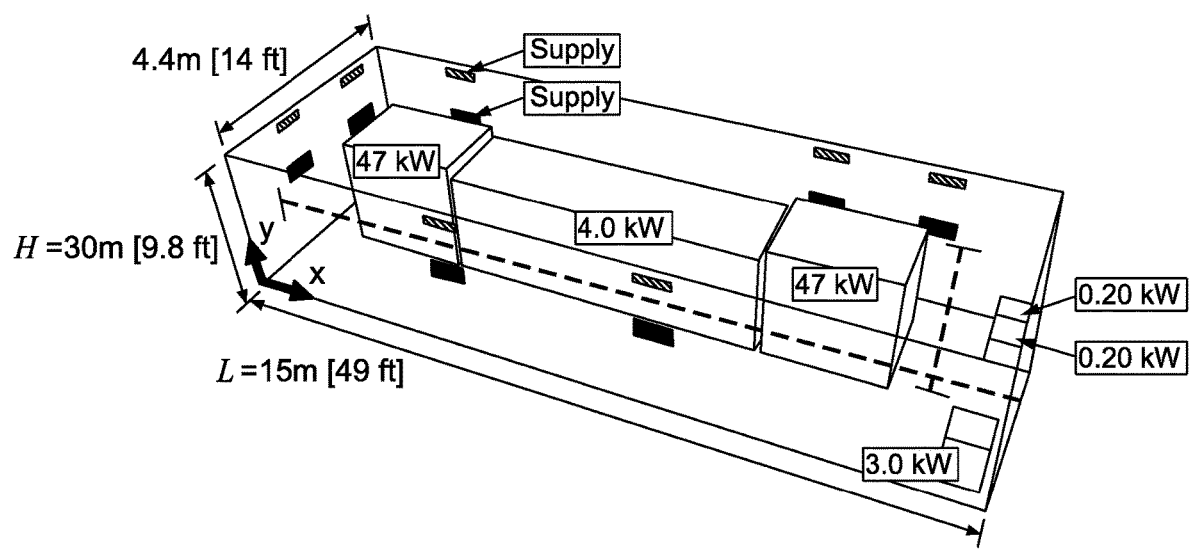
FIGS. 4A-4C illustrate a 3-D modular substation example application.

FIG. 4A shows modular substation with indicated dimensions and equipment heat dissipation. All equipment is modeled as high-conductivity blocks. Cooling is provided by seven externally-wall-mounted cooling units each consisting of a supply located above a return. The total cooling airflow rate is 5.62 m³/s (11,900 cfm) and the supply temperature is 15° C. (59° F.). A dimensionless temperature in terms of the average outlet temperature $T_{out}$ is defined. For simplicity, solar load and, indeed, all external-wall heat transfer is ignored. An important design goal for such implementations is to maintain air temperatures immediately around the equipment within a specified define range. As the 2D laminar results were quite poor and the iterative wall function model was nearly identical to the approximate version, these models are not considered further. Also, lacking measurement data, zero-equation and k-ϵ predictions are compared.

Figure 4B:
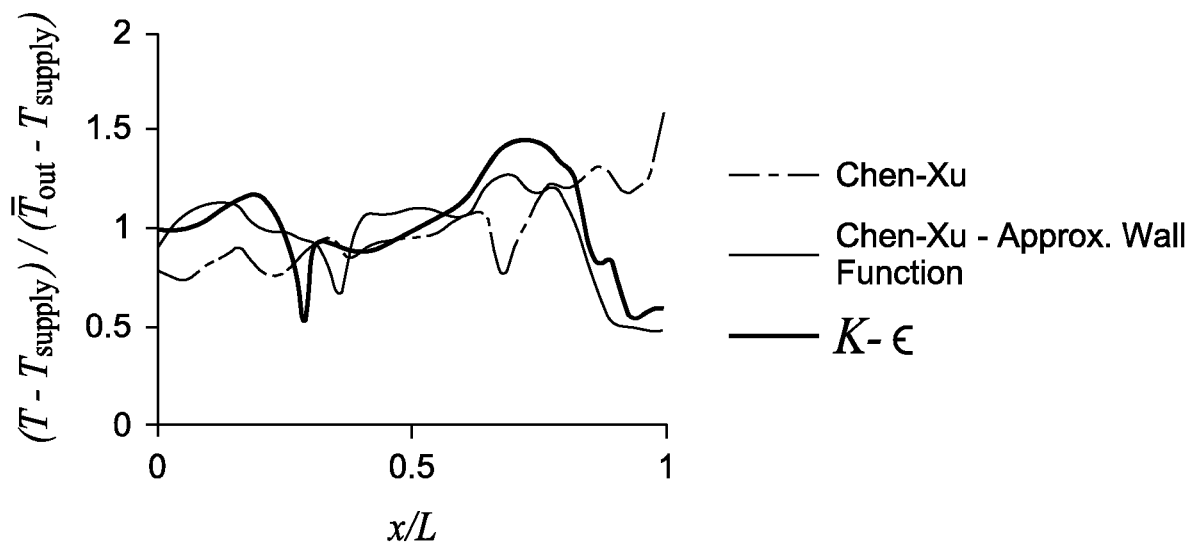
Figure 4C:
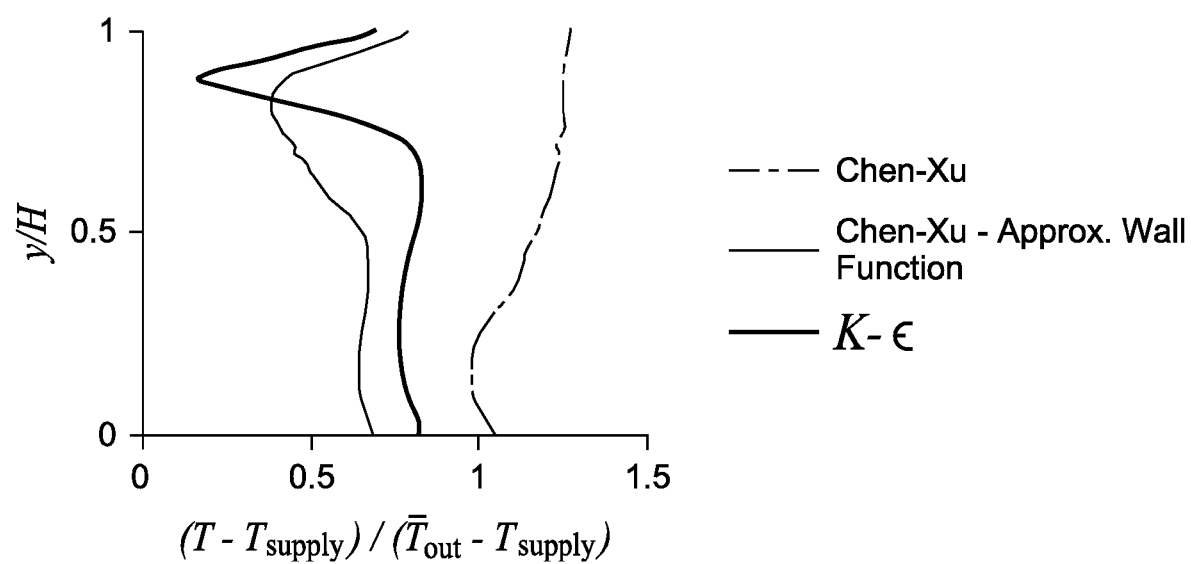

FIGS. 4B and 4C show temperature predictions respectively along a horizontal line just above the equipment and a vertical line to the right of the equipment. These lines are illustrated as dashed lines in FIG. 4A. The variant with the approximate wall function performs better than the original Chen-Xu model along the horizontal line; the improvement relative to the k-ϵ model is even more significant along the vertical line. While the results of FIG. 4B-4C are limited, they are representative of what was generally observed throughout the modular substation.

Computer System

Figure 5:
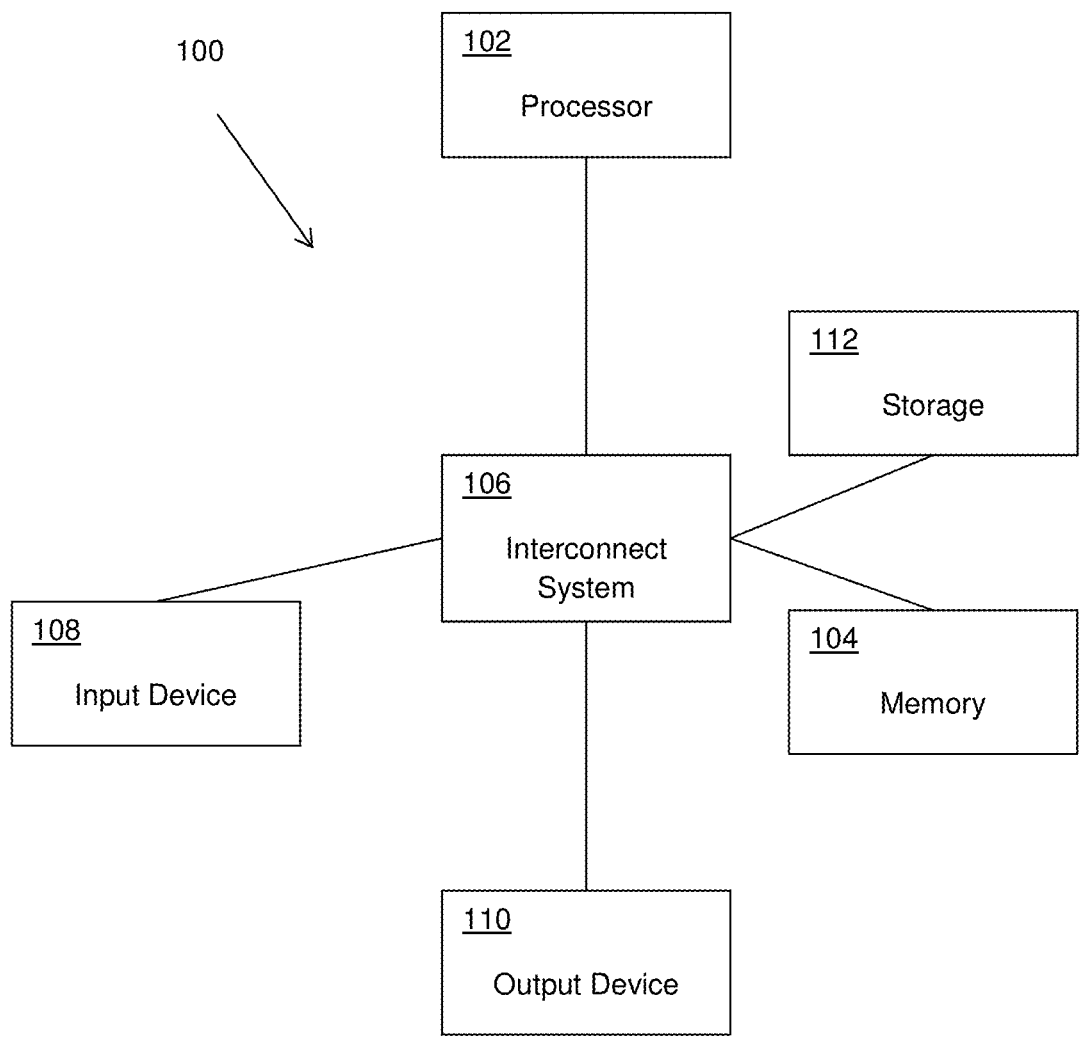
FIG. 5 illustrates a computer system upon which aspects of methods disclosed herein may be performed.

A computer system upon which various of the computational methods disclosed herein may be performed is illustrated schematically in FIG. 5. The computer system 100 may include a processor 102 connected to one or more memory devices 104, such as a disk drive, solid state memory, or other non-transitory recording medium for storing data. Memory 104 is typically used for storing programs and data during operation of the computer system 100. Components of computer system 100 may be coupled by an interconnection mechanism 106, which may include one or more busses (e.g., between components that are integrated within a same machine) and/or a network (e.g., between components that reside on separate discrete machines). The interconnection mechanism 106 enables communications (e.g., data, instructions) to be exchanged between system components of system 100. Computer system 100 also includes one or more input devices 108, for example, a keyboard, mouse, trackball, microphone, touch screen, and one or more output devices 110, for example, a printing device, display screen, and/or speaker. The output devices 110 may also include one or more controllers for a cooling system of a data center.

The computer system may include specially-programmed, special-purpose hardware, for example, an application-specific integrated circuit (ASIC). Aspects and embodiments disclosed herein may be implemented in software, hardware or firmware, or any combination thereof. Further, such methods, acts, systems, system elements and components thereof may be implemented as part of the computer system described above or as an independent component.

Although computer system 100 is shown by way of example as one type of computer system upon which various aspects and embodiments disclosed herein may be practiced, it should be appreciated that aspects and implementations disclosed herein are not limited to being implemented on the computer system as shown in FIG. 5. Various aspects and implementations disclosed herein may be practiced on one or more computers having a different architecture or components than shown in FIG. 5.

Computer system 100 may be a general-purpose computer system that is programmable using a high-level computer programming language. Computer system 100 may be also implemented using specially programmed, special purpose hardware. In computer system 100, processor 102 is typically a commercially available processor such as the well-known Pentium™ or Core™ class processors available from the Intel Corporation. Many other processors are available, including programmable logic controllers. Such a processor usually executes an operating system which may be, for example, the Windows 7, Windows 8, or Windows 10 operating system available from the Microsoft Corporation, the MAC OS System X available from Apple Computer, the Solaris Operating System available from Sun Microsystems, or UNIX available from various sources. Many other operating systems may be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects and embodiments disclosed herein may be performed on a client-server system that includes components distributed among one or more server systems that perform various functions according to various aspects and embodiments disclosed herein. These components may be executable, intermediate (e.g., IL) or interpreted (e.g., Java) code which communicate over a communication network (e.g., the Internet) using a communication protocol (e.g., TCP/IP). In some embodiments one or more components of the computer system 100 may communicate with one or more other components over a wireless network, including, for example, a cellular telephone network.

It should be appreciated that the aspects and implementations disclosed herein are not limited to executing on any particular system or group of systems. Also, it should be appreciated that the aspects and implementations disclosed herein are not limited to any particular distributed architecture, network, or communication protocol. Various aspects and implementations disclosed herein are may be programmed using an object-oriented programming language, such as SmallTalk, Java, C++, Ada, or C# (C-Sharp). Other object-oriented programming languages may also be used. Alternatively, functional, scripting, and/or logical programming languages may be used, for example, ladder logic. Various aspects and implementations disclosed herein may be implemented in a non-programmed environment (e.g., documents created in HTML, XML or other format that, when viewed in a window of a browser program, render aspects of a graphical-user interface (GUI) or perform other functions). Various aspects and implementations s disclosed herein may be implemented as programmed or non-programmed elements, or any combination thereof.

CONCLUSION

Zero-equation turbulence models were evaluated for use in large electrical and electronics enclosures. In the two 2D benchmark cases considered, the Chen-Xu model with wall function provides slightly better agreement to measurement data than its original counterpart. There are negligible differences between the rigorous and approximate wall function models and the approximate version exhibits greater computational efficiency. Laminar predictions (with a coarse grid) mostly showed poor agreement to measurement data which indicates that the effects of turbulence should not be simply ignored even for simple design tools. In the 3D containerized substation model, the Chen-Xu with approximate wall function again provided generally better comparisons than its original counterpart to the reference k-$\epsilon$ model predictions.

The disclosed models may be utilized to analyze temperature and/or airflow distribution in a data center or other area. Locations of equipment in the data center or other area and/or the configuration (e.g. degree of openness) or location of vents and/or operating parameters of cooling units may be changed based on the results of the analysis performed using these models to improve the operation of the data center by, for example, providing for adequate and uniform cooling throughout the data center or other area, mitigating hot spots, and/or increasing the efficiency of the cooling system by reducing power when possible while maintaining a desired amount of cooling.

| Nomenclature | | | |
|---|---|---|---|
| $\alpha$ | Thermal diffusivity | H | Enclosure dimension |
| $\alpha_{\mathit{eff}}$ | Effective thermal diffusivity | k | Turbulent kinetic energy |
| $\alpha_t$ | Turbulent thermal diffusivity | L | Enclosure dimension |
| $\epsilon$ | Turbulent dissipation | $Pr_t$ | Turbulent Prandtl Number |
| $\mu$ | Viscosity | $Re_d$ | Reynolds Number based on d |
| $\mu_{\mathit{eff}}$ | Effective viscosity | T | Temperature |
| $\mu_t$ | Turbulent viscosity | u | x-component of velocity, or velocity parallel to wall |
| $\mu+$ | Total dimensionless viscosity | u+ | Dimensionless u velocity |
| $\rho$ | Fluid density | u* | Friction velocity |
| $\tau_w$ | Wall shear stress | $U_{in}$ | Inlet velocity |
| d | Distance to nearest solid object | v | y-component of velocity |
| $h_{in}$ | Inlet height | V | Mean velocity |
| $h_{out}$ | Outlet height | y+ | Dimensionless distance from wall |

Having thus described several aspects of at least one embodiment of this invention, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure, and are intended to be within the scope of the invention. Accordingly, the foregoing description and drawings are by way of example only.

What is claimed is:

1. A method comprising:
performing an analysis of airflow and temperature distribution in an indoor environment utilizing a hybrid turbulence model including a Chen-Xu model used for analysis of bulk flow and a wall function used in first grid cells bounding solid objects in the indoor environment, wherein the analysis of airflow and temperature is performed utilizing an approximate wall function technique that utilizes iterative computations to determine turbulent airflow velocity in the first grid cells bounding solid objects in the indoor environment; and
adjusting physical layout and/or operating parameters of heat producing electrical equipment and/or a cooling system of the indoor environment responsive to results of the analysis to improve one of temperature distribution within the indoor environment and operating efficiency of the cooling system of the indoor environment.

2. The method of claim 1, wherein the analysis of airflow and temperature is performed on an indoor environment having dimensions consistent with those of an industry standard ISO shipping container.

3. The method of claim 1, wherein the analysis of airflow and temperature is performed on an indoor environment including an externally mounted cooling system.

4. The method of claim 3, wherein the analysis of airflow and temperature is performed on an indoor environment including cooling air supply vents defined in external walls of the indoor environment.

5. The method of claim 1, wherein the analysis of airflow and temperature is performed utilizing a Cartesian grid system with uniform computationally defined grid cells.

6. The method of claim 1, wherein the analysis of airflow and temperature is performed utilizing an approximate wall function technique that does not utilize iterative computations to determine turbulent airflow velocity in the first grid cells bounding solid objects in the indoor environment.

7. The method of claim 6, wherein the approximate wall function technique defines a ratio of turbulent airflow velocity to airflow velocity parallel a wall in the first grid cells bounding solid objects in the indoor environment as a function of Reynolds number in the first grid cells bounding solid objects in the indoor environment.

8. The method of claim 1, wherein turbulent thermal diffusivity in the first grid cells bounding solid objects in the indoor environment is determined as a function of the turbulent airflow velocity in the first grid cells bounding solid objects in the indoor environment.

9. The method of claim 1, wherein adjusting the physical layout and/or operating parameters of the heat producing electrical equipment and/or cooling system of the indoor environment responsive to the results of the analysis causes air temperatures immediately around equipment in the indoor environment to be maintained within a defined range.

10. A computer system including a memory programmed with instructions which, when executed, cause the computer system to perform a method comprising:
performing an analysis of airflow and temperature distribution in an indoor environment utilizing a hybrid turbulence model including a Chen-Xu model used for analysis of bulk flow and a wall function used in first grid cells bounding solid objects in the indoor environment, wherein the analysis of airflow and temperature is performed utilizing an approximate wall function technique that utilizes iterative computations to determine turbulent airflow velocity in the first grid cells bounding solid objects in the indoor environment; and
adjusting physical layout and/or operating parameters of heat producing electrical equipment and/or a cooling system of the indoor environment responsive to results of the analysis to improve one of temperature distribution within indoor environment and operating efficiency of the cooling system of the indoor environment.

11. The computer system of claim 10, wherein the analysis of airflow and temperature is performed on an indoor environment having dimensions consistent with those of an industry standard ISO shipping container.

12. The computer system of claim 10, wherein the analysis of airflow and temperature is performed on an indoor environment including an externally mounted cooling system.

13. The computer system of claim 12, wherein the analysis of airflow and temperature is performed on an indoor environment including cooling air supply vents defined in external walls of the indoor environment.

14. The computer system of claim 10, wherein the analysis of airflow and temperature is performed utilizing a Cartesian grid system with uniform computationally defined grid cells.

15. The computer system of claim 10, wherein the analysis of airflow and temperature is performed utilizing an approximate wall function technique that does not utilize iterative computations to determine turbulent airflow velocity in the first grid cells bounding solid objects in the indoor environment.

16. The computer system of claim 15, wherein the approximate wall function technique defines a ratio of turbulent airflow velocity to airflow velocity parallel a wall in the first grid cells bounding solid objects in the indoor environment as a function of Reynolds number in the first grid cells bounding solid objects in the indoor environment.

17. The computer system of claim 10, wherein turbulent thermal diffusivity in the first grid cells bounding solid objects in the indoor environment is determined as a function of the turbulent airflow velocity in the first grid cells bounding solid objects in the indoor environment.

18. The computer system of claim 10, wherein adjusting the physical layout and/or operating parameters of the indoor environment responsive to the results of the analysis causes air temperatures immediately around equipment in the indoor environment to be maintained within a defined range.

19. A method comprising:
   performing an analysis of airflow and temperature distribution in an indoor environment utilizing a hybrid turbulence model including a Chen-Xu model used for analysis of bulk flow and a wall function used in first grid cells bounding solid objects in the indoor environment, wherein the analysis of airflow and temperature is performed utilizing an approximate wall function technique that does not utilize iterative computations to determine turbulent airflow velocity in the first grid cells bounding solid objects in the indoor environment and wherein the approximate wall function technique defines a ratio of turbulent airflow velocity to airflow velocity parallel a wall in the first grid cells bounding solid objects in the indoor environment as a function of Reynolds number in the first grid cells bounding solid objects in the indoor environment; and
   adjusting physical layout and/or operating parameters of heat producing electrical equipment and/or a cooling system of the indoor environment responsive to results of the analysis to improve one of temperature distribution within the indoor environment and operating efficiency of the cooling system of the indoor environment.

20. A computer system including a memory programmed with instructions which, when executed, cause the computer system to perform a method comprising:
   performing an analysis of airflow and temperature distribution in an indoor environment utilizing a hybrid turbulence model including a Chen-Xu model used for analysis of bulk flow and a wall function used in first grid cells bounding solid objects in the indoor environment, wherein the analysis of airflow and temperature is performed utilizing an approximate wall function technique that does not utilize iterative computations to determine turbulent airflow velocity in the first grid cells bounding solid objects in the indoor environment and wherein the approximate wall function technique defines a ratio of turbulent airflow velocity to airflow velocity parallel a wall in the first grid cells bounding solid objects in the indoor environment as a function of Reynolds number in the first grid cells bounding solid objects in the indoor environment; and
   adjusting physical layout and/or operating parameters of heat producing electrical equipment and/or a cooling system of the indoor environment responsive to results of the analysis to improve one of temperature distribution within indoor environment and operating efficiency of the cooling system of the indoor environment.

* * * * *